United States Patent
Dobner et al.

(10) Patent No.: US 6,638,362 B2
(45) Date of Patent: Oct. 28, 2003

(54) METHODS FOR SEPARATING MATERIAL FROM A MOLD SURFACE

(75) Inventors: Michael H. Dobner, Honeoye Falls, NY (US); Craig A. Barrile-Josephson, Rochester, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/068,279

(22) Filed: Feb. 7, 2002

(65) Prior Publication Data

US 2002/0079609 A1 Jun. 27, 2002

Related U.S. Application Data

(62) Division of application No. 09/628,517, filed on Jul. 31, 2000, now Pat. No. 6,368,096.

(51) Int. Cl.$^7$ .............................. B08B 7/00; B29D 11/00
(52) U.S. Cl. .............................. 134/8; 134/6; 425/229; 425/231
(58) Field of Search .......................... 134/6, 8; 425/215, 425/229, 231

(56) References Cited

U.S. PATENT DOCUMENTS

| | | | | |
|---|---|---|---|---|
| 4,516,301 A | * | 5/1985 | Westerman et al. | 29/27 C |
| 5,167,968 A | * | 12/1992 | Dunlap et al. | 425/302.1 |
| 5,466,147 A | | 11/1995 | Appleton | 425/412 |
| 5,578,332 A | | 11/1996 | Hamilton | 425/555 |
| 5,882,698 A | | 3/1999 | Su | 425/215 |
| 5,975,875 A | | 11/1999 | Crowe, Jr. | 425/215 |

* cited by examiner

*Primary Examiner*—Zeinab El-Arini
(74) *Attorney, Agent, or Firm*—Katherine McGuire

(57) ABSTRACT

Method for removing unwanted excess material from a mold section is particularly adapted for removing a monomer ring adhered within a reservoir of a female mold section used to mold a contact lens. The invention involves piercing the monomer ring and rotating the piercing members (e.g., annularly spaced pins) relative to the mold section whereby the monomer ring is sheared from the mold section to which it was adhered while the molded lens is left intact in the mold section.

3 Claims, 6 Drawing Sheets

METHODS FOR SEPARATING MATERIAL FROM A MOLD SURFACE

This is a divisional of Application No. 09/628,517, filed Jul. 31, 2000, now U.S. Pat. No. 6,368,096.

BACKGROUND OF THE INVENTION

The present invention relates to molding of articles of manufacture, and more particularly relates to methods and apparatus for separating excess, unwanted lens material from a mold surface. The present invention has particular application to the production of molded ophthalmic lenses such as contact lenses and intraocular lenses.

Static cast molding of contact lenses is known. See, for example, U.S. Pat. No. 5,466,147 issued to Bausch & Lomb Incorporated, the entire reference of which is incorporated herein by reference. A single mold unit for making a single lens comprises a female mold section having a concave optical surface and a male mold section having a convex optical surface. The female and male mold sections are complimentary shaped and are brought together to form a lens-molding cavity between the facing concave and convex optical surfaces of the female and male mold sections, respectively.

Although less popular than full cast molding, forming lenses by spin-casting is also known where lens material is deposited into a female mold section and spun to form the anterior surface of the lens. The posterior surface is then formed by a lathe cutting operation. In this method of lens manufacture, excess material may also form on the female mold section with may require removal prior to lens release from the mold.

The basic process for cast molding a lens is as follows. A quantity of liquid lens material is dispensed into the concave optical surface of the female mold section and the male mold section is seated upon the female mold section with the concave and convex surfaces thereof facing one another to form a lens-shaped mold cavity. The joined female and male mold sections form a single mold unit which is subject to a curing cycle (e.g., by thermal or UV radiation) thereby causing polymerization of the lens material in the mold cavity. Once the lens material has cured, the male and female mold sections must be separated to retrieve the cured lens.

The opening or release of the mold sections must be carried out in a manner which will not harm the delicate lens. Once the lens has polymerized in the mold cavity, the lens and any excess lens material will have an adhesive bond to the opposite concave and convex mold surfaces. Thus, the release of the male mold section from the female mold section must be of a force strong enough to break the adhesive bond of the lens and excess lens material to the opposing mold surfaces, yet not so forceful or haphazard that the optical surfaces of the lens are harmed by the release process. Should the lens crack or be otherwise damaged during the mold release process, the lens must be scrapped, thereby lowering the output yield and increasing manufacturing costs.

Once the mold sections have been separated, the lens will adhere to one of the mold surfaces and must therefore be released from the mold section on which it is retained. Both wet and dry release methods of lens release have been proposed in the prior art. In wet lens release methods, an aqueous solution is used to wet the hydrophilic lens which absorbs water and swells, causing the lens to separate from the mold surface. In dry release methods, the lens is removed from the associated mold surface while still in the dry state. The adhesive bond between the lens and mold surface is broken, usually by application of a force to the mold body, for example by squeezing or pressing against the non-optical surface of the mold to move the mold surface relative to the rigid lens. Once the adhesive bond has been broken, the lens is retrieved, for example by a vacuum picking tool.

To ensure that the mold cavity is completely filled with the liquid lens material during the molding process described above, the quantity of liquid lens material dispensed in the female mold section is purposely greater than that needed to form the lens. When the male mold section is seated upon the female mold section, the excess liquid lens material is expelled from the mold cavity. This excess liquid is typically held in a reservoir, groove or flange surrounding the mold cavity and is cured along with the lens. The cured excess material is typically referred to as a "monomer ring" or "hema ring" in the contact lens art depending on the specific lens material used. The term "monomer ring" will be used herein for convenience, although it is understood this term is used broadly herein to cover any type of lens material employed.

During mold separation, the monomer ring will usually adhere to one of the mold sections with the monomer ring usually retained in the female mold section along with the lens. Should the lens be released and removed from the female mold surface without prior removal of the monomer ring from the reservoir, the lens edge will likely be damaged due to interference with the monomer ring. This problem is illustrated in prior art FIG. 5C herein. Presence of the monomer ring can also interfere with downstream processes and machinery. It is thus desirable to release and remove the monomer ring from the female mold section prior to release and removal of the lens therefrom.

Various monomer ring removal processes have been employed in the prior art, none of which has proven very satisfactory.

SUMMARY OF THE INVENTION

The present invention is directed toward a method and apparatus for removing a monomer ring from the mold section to which it is adhered following mold separation. The monomer ring may be located on a flange, groove, or reservoir surrounding the molding surface.

The present invention is particularly useful for removing cured excess material formed in contact lens or intraocular lens molds, although it is equally applicable to other molds requiring removal of excess material. Excess material in an ophthalmic mold, also known as a monomer ring, can cause damage to the molded lens if the monomer ring is not released and removed from the mold section prior to release and removal of the lens from the mold section.

In the preferred embodiment, following the curing stage, the mold is opened and the mold section to which the monomer ring and lens are adhered is presented for removal of the monomer ring while leaving the lens unharmed and intact. The monomer ring is removed by a plurality of members (e.g., pins or blades) which descend from a location directly above the mold section to pierce the monomer ring but not so deep as to penetrate the mold section. The pins then rotate which shears the monomer ring free of the mold section. The pins are then raised, carrying the monomer ring along with it for disposal. Thereafter, the now monomer ring-free mold section having the lens adhered thereto is transferred to a lens release station and further downline processing as desired. As used herein, the word "pierce" is broadly interpreted to mean any device or member capable of engaging and moving the monomer ring relative to the mold.

DETAILED DESCRIPTION

Figure 1:
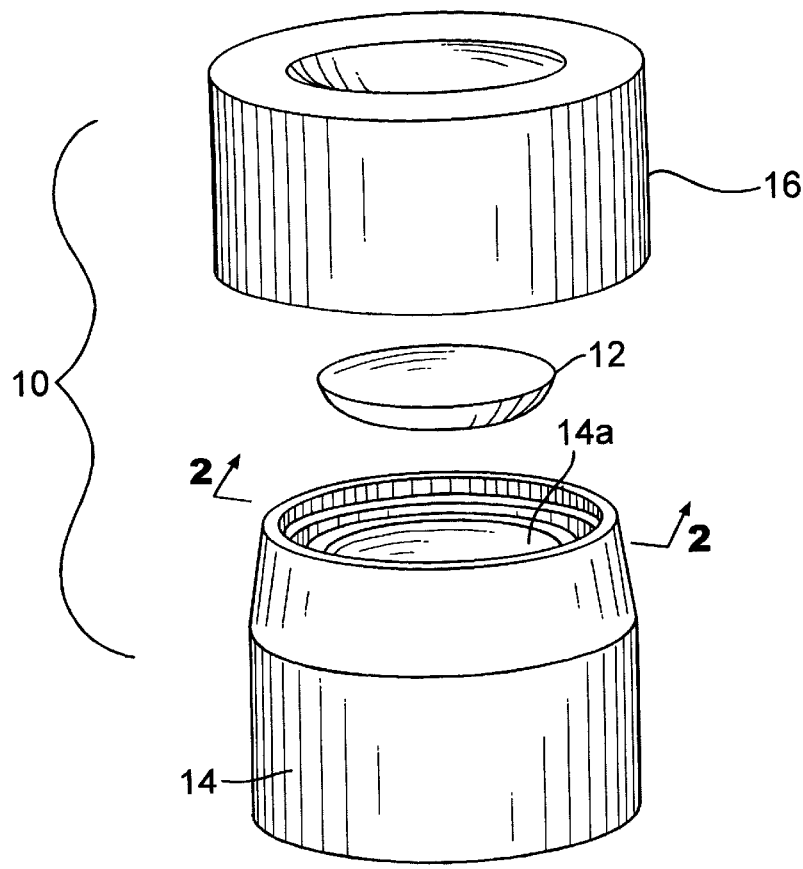
FIG. 1 is a perspective view of a prior art contact lens mold comprising a male mold section spaced above a lens and a female mold section.
Figure 2:
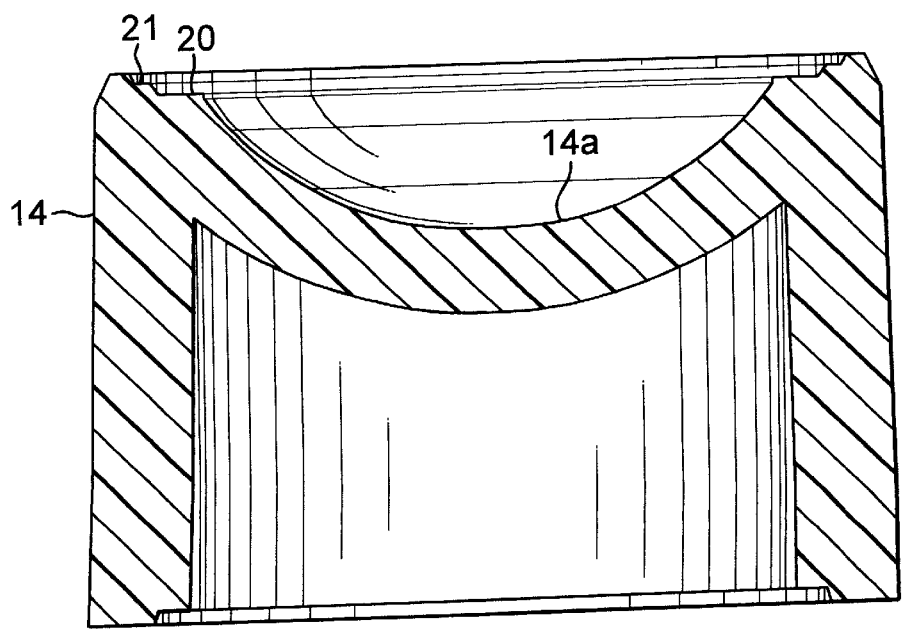
FIG. 2 is an enlarged, cross-sectional view of the female mold section of FIG. 1.
Figure 3:
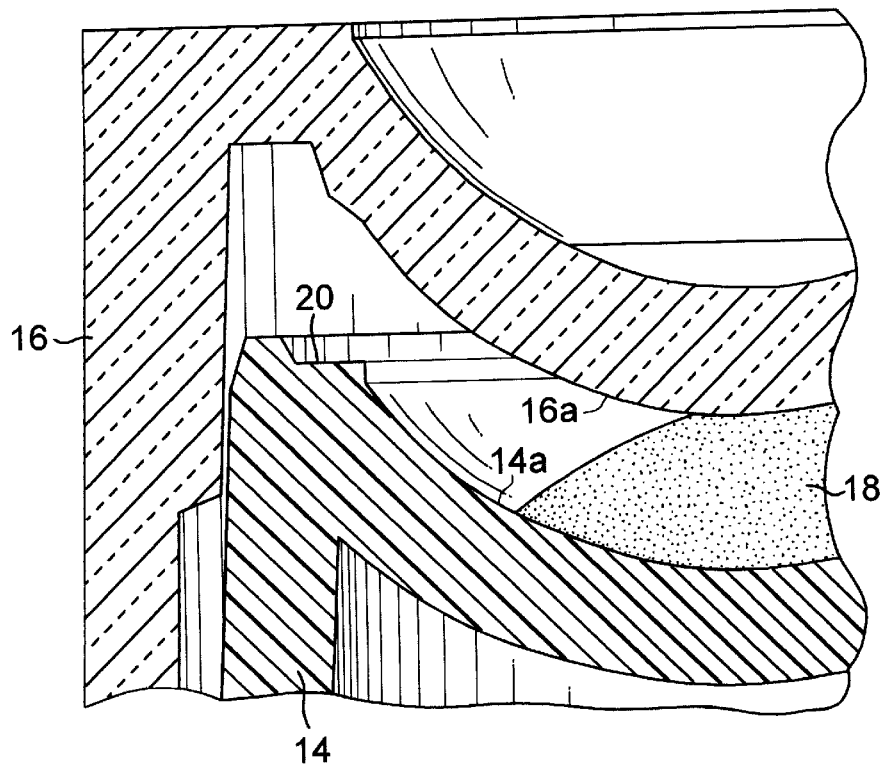
FIG. 3 is an enlarged, fragmented, cross-sectional view of a prior art contact lens mold in the process of molding a contact lens therein.
Figure 4:
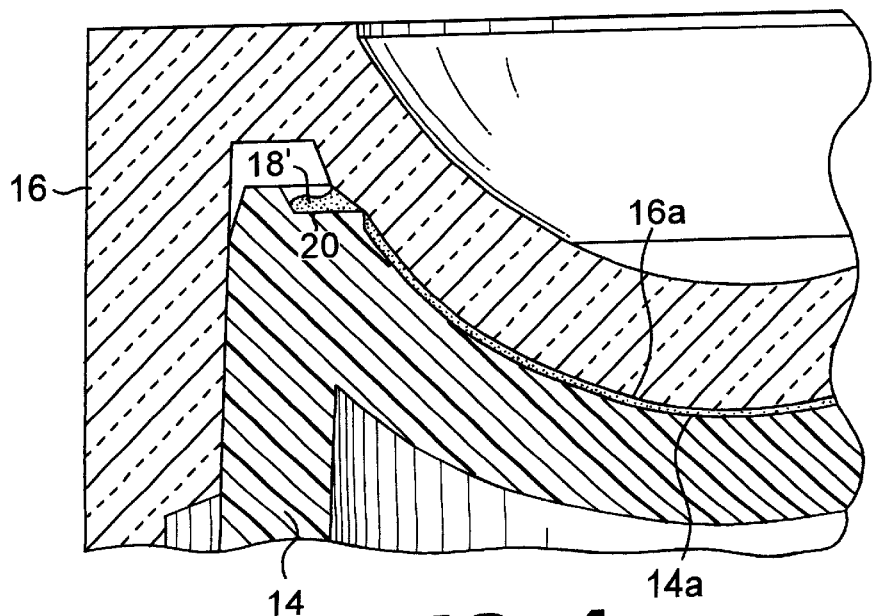
FIG. 4 is the view of FIG. 3 showing the mold in the fully closed position.

Referring to FIGS. 1–5, a prior art mold 10 for cast molding an ophthalmic lens 12 is seen to comprise a female mold section 14 having a concave optical surface 14a and a male mold section 16 having a complimentary shaped convex mold surface 16a. In cast molding of an ophthalmic lens 12, a liquid lens material 18 is dispensed into the concave surface 14a of the female mold section 14. The male mold section 16 is seated upon the female mold section 14 until the mold surfaces 14a, 16a thereof are closely adjacent as seen in FIG. 4. As the mold surfaces move toward each other, excess liquid lens material is expelled into a reservoir 20 located peripherally of the mold surfaces 14a, 16a (FIG. 4). U.S. Pat. No. 5,466,147 discloses such a mold for molding lenses, especially contact lenses. Upon polymerization, the lens material between the mold surfaces 14a, 16a is cured to form a lens 12 (FIG. 1), together with the excess lens material 18' located in reservoir 20 which, in the cured state, is referred to as a monomer ring denoted by reference numeral 18" seen in FIGS. 5a–c.

Figure 5A:
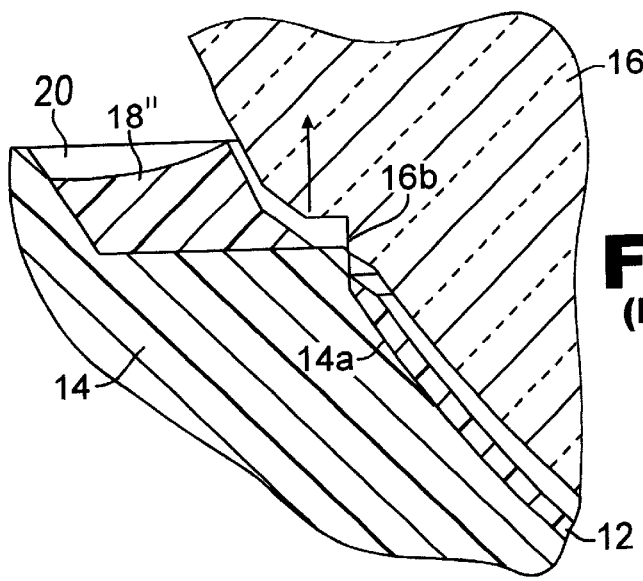
FIGS. 5a–c are enlarged, detail views of the reservoir area of the mold of FIGS. 1–4 in sequential process steps of lens cure, mold separation and lens and monomer ring release, respectively.
Figure 5B:
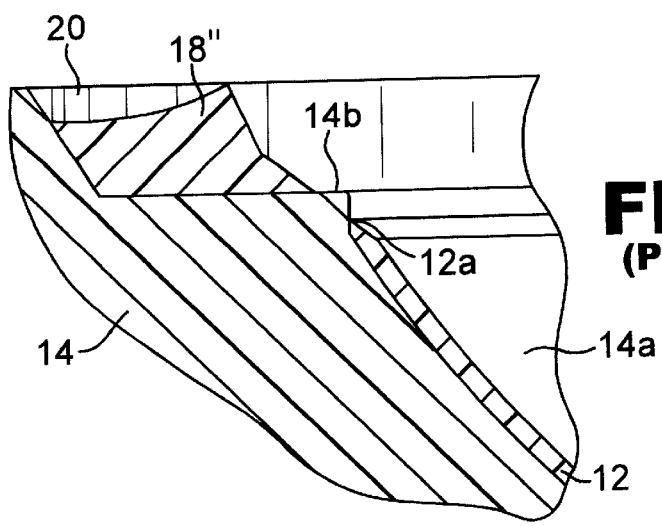
Figure 5C:
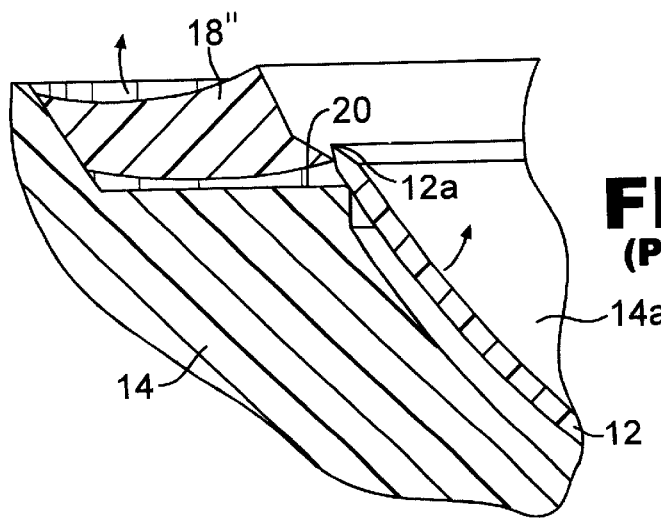

The '147 patent recognized the problems associated with the attempted removal of the lens prior to removal of the monomer ring from a mold section which is illustrated herein in FIGS. 5a–c. FIG. 5a illustrates opening of the mold once the lens material has been cured where the male mold section 16 is lifted from the female mold section 14. As is typically the case in this type of mold design, the lens 12 and monomer ring 18" remain adhered to the female mold section 14. In the mold design of the '147 patent, the female mold section includes a knife edge 14b which interacts with an annulus 16b formed on the male mold section 16 to form the lens edge 12a. As seen in FIG. 5c, removal of lens 12 from the female mold section 14 without having first removed the monomer ring 18" may result in accidental engagement between the lens edge 12a and the monomer ring 18" which could irreversibly damage the lens edge 12a. This problem is exacerbated when a wet lens release method is employed which involves hydrating the lens which swells and releases from the female mold surface. Due to the swelling of the lens, the lens edge may push against the monomer ring and be damaged thereby. Although the problem is pronounced in the wet lens release method, there remains the chance of lens damage in a dry lens release method as well.

The '147 patent describes a method of releasing the monomer ring with removal of the male mold section by incorporating a feature into the male mold section to which the monomer ring will attach upon cure (see feature 79 in FIGS. 18 and 19 therein). In the '147 method, the monomer ring detaches from the female mold section upon lifting the male mold section therefrom. Since it is not always possible to incorporate this type of monomer ring removal mechanism in a particular mold design, the present invention offers a method of monomer ring removal from the female mold section which may be employed on molds having a variety of different mold designs.

FIG. 5b illustrates an enlarged cross-sectional area of the female mold section 14 where the lens edge 12a and monomer ring 18" lie within the female mold section following removal of the male mold section 16 therefrom. The female mold section 14, lens 12 and monomer ring 18" is in this condition upon presentation to the apparatus and method of the present invention for removing the monomer ring 18" therefrom, the preferred embodiment of which is illustrated in FIGS. 6–9.

A monomer ring removal mechanism is indicated generally by the reference numeral 30 which may be mounted upon a table 32 which is part of a contact lens production line. Upstream and downstream processing may vary according to need and is not critical to the operation of the invention described herein. Typical upstream processing would include mold production, monomer fill of the mold, mold clamping and curing, and opening of the mold. Once the mold has been opened, the male mold section 16 is set aside and the female mold section 14 is presented to the monomer ring removal mechanism 30. Once the monomer ring has been removed by mechanism 30 in the manner to be described, the female mold section 14, now having only a lens 12 adhered thereto, is transferred to subsequent processing stations such as lens release, with the lens further undergoing lens hydration and extraction, lens packaging and inspection as required for the particular production process employed.

Figure 6:
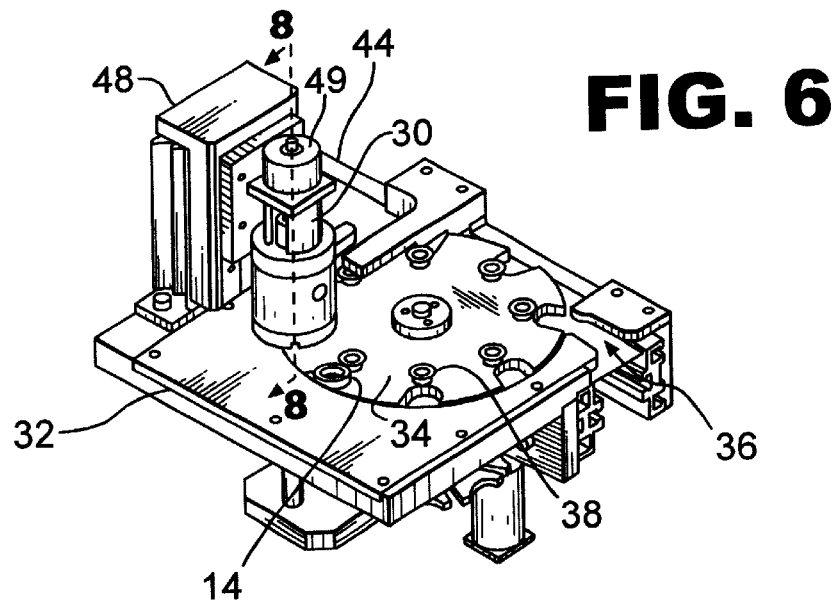
FIG. 6 is a perspective view of an apparatus for carrying out the method of the present invention.
Figure 7:
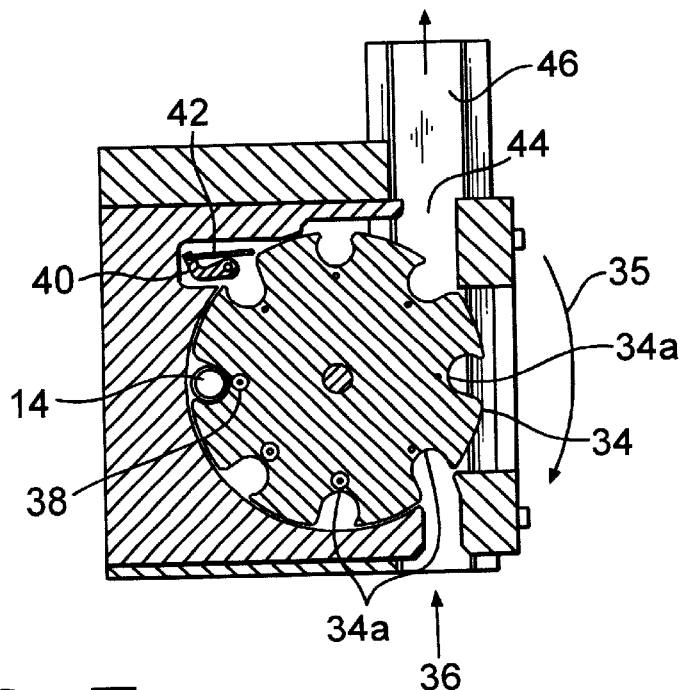
FIG. 7 is a top plan view of FIG. 6 with certain parts not shown for clarity.

As seen in FIGS. 6 and 7, the monomer ring removal mechanism 30 may be mounted upon a table 32 having a rotating carousel 34 for handling of the female mold sections 14 through this station, although other mold handling means may be employed as desired. In the embodiment of FIGS. 6 and 7, the female mold sections 14, with respective lens 12 and monomer ring 18" intact, are delivered onto table 32 at location 36 (e.g., by a conveyor 46). As a female mold section 14 is delivered onto table 32, carousel 34 is indexed in the direction of arrow 35 whereupon female mold section 14 is captured by one of a plurality of peripheral recesses 34a in carousel 34 and move together with the next indexing movement of the carousel 34. This is continued with each successive recess 34a engaging a respective female mold section 14 at input 36. To ensure limited radial movement of the female mold section 14 within a respective recess 34a, a spool 38 may be fixed to carousel 34 adjacent each recess 34a which restrains the respective female mold section 14 as the carousel is indexed about table 32.

Mechanism 30 is shown mounted to table 32 at a location approximately 180° from the mold section input 36, although this spacing may vary as desired. The positioning of the mechanism 30 is such that each sequential recess 34a will come to rest directly beneath mechanism 30 upon each indexed movement of carousel 34. As seen in FIG. 7, the location of mechanism 30 includes a second spool element in the form of a biasing pawl mechanism 40, 42 which act to bear against the female mold section to restrict substantially all rotational movement thereof within recess 34a during engagement of the female mold section 14 with mechanism 30. Once mechanism 30 has removed the monomer ring 18" from a respective female mold section 14 in the manner to be described, the carousel 34 is again indexed about arrow 35 whereupon the female mold section 14 is eventually output from table 32 at location 44 by a conveyor 46, for example, which transports the female mold section 14 and adhered lens 12 to a lens release and removal station (not shown). It will be appreciated that once a female mold section 14 has been transported off table 32, the recess 34a in which it was housed is now empty as it travels again toward input 36 to capture a new female mold section for processing by mechanism 30.

Figure 8:
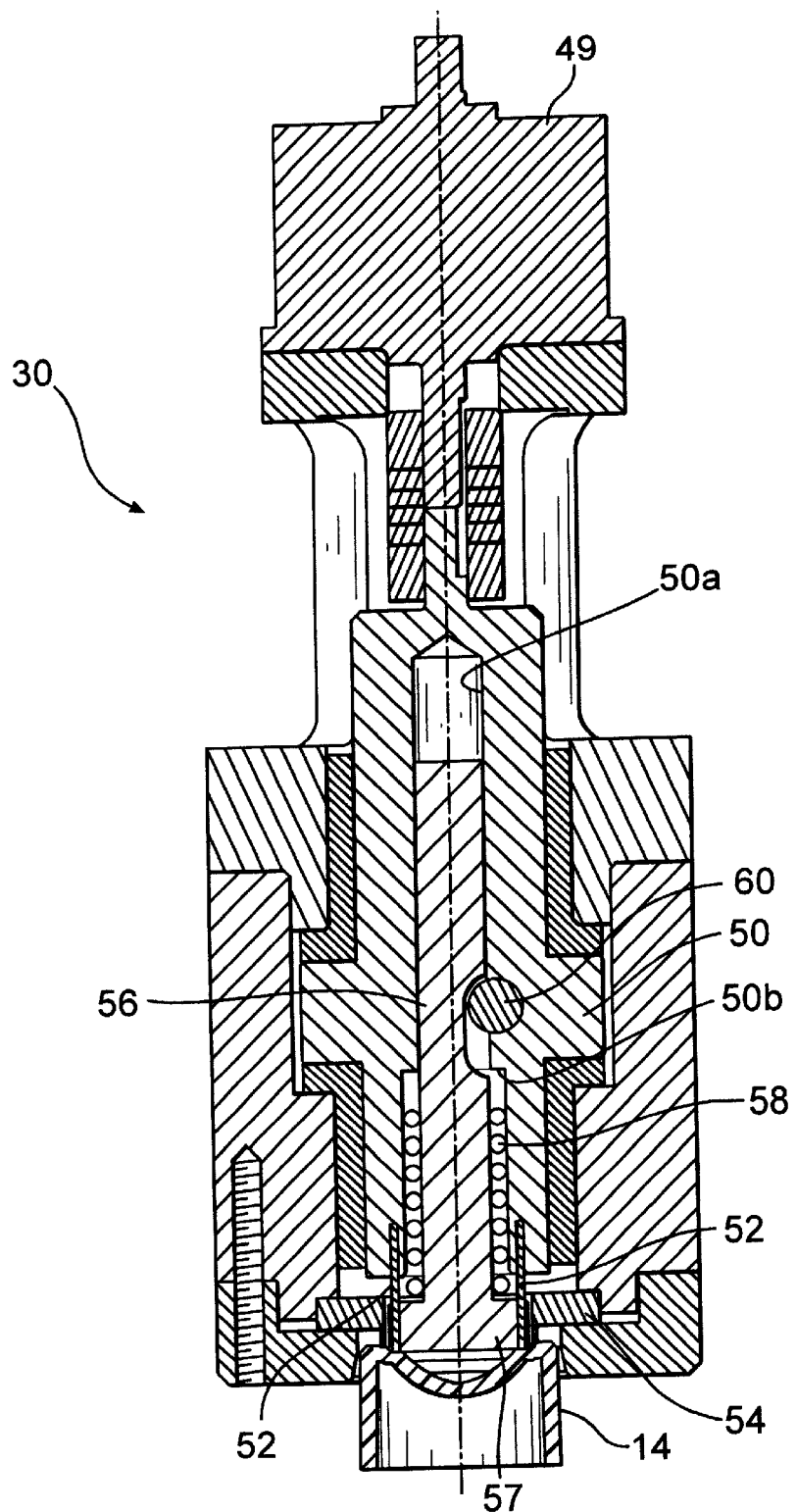
FIG. 8 is a cross-sectional view of the apparatus as taken along the line 8–8 in FIG. 6.
Figure 9:
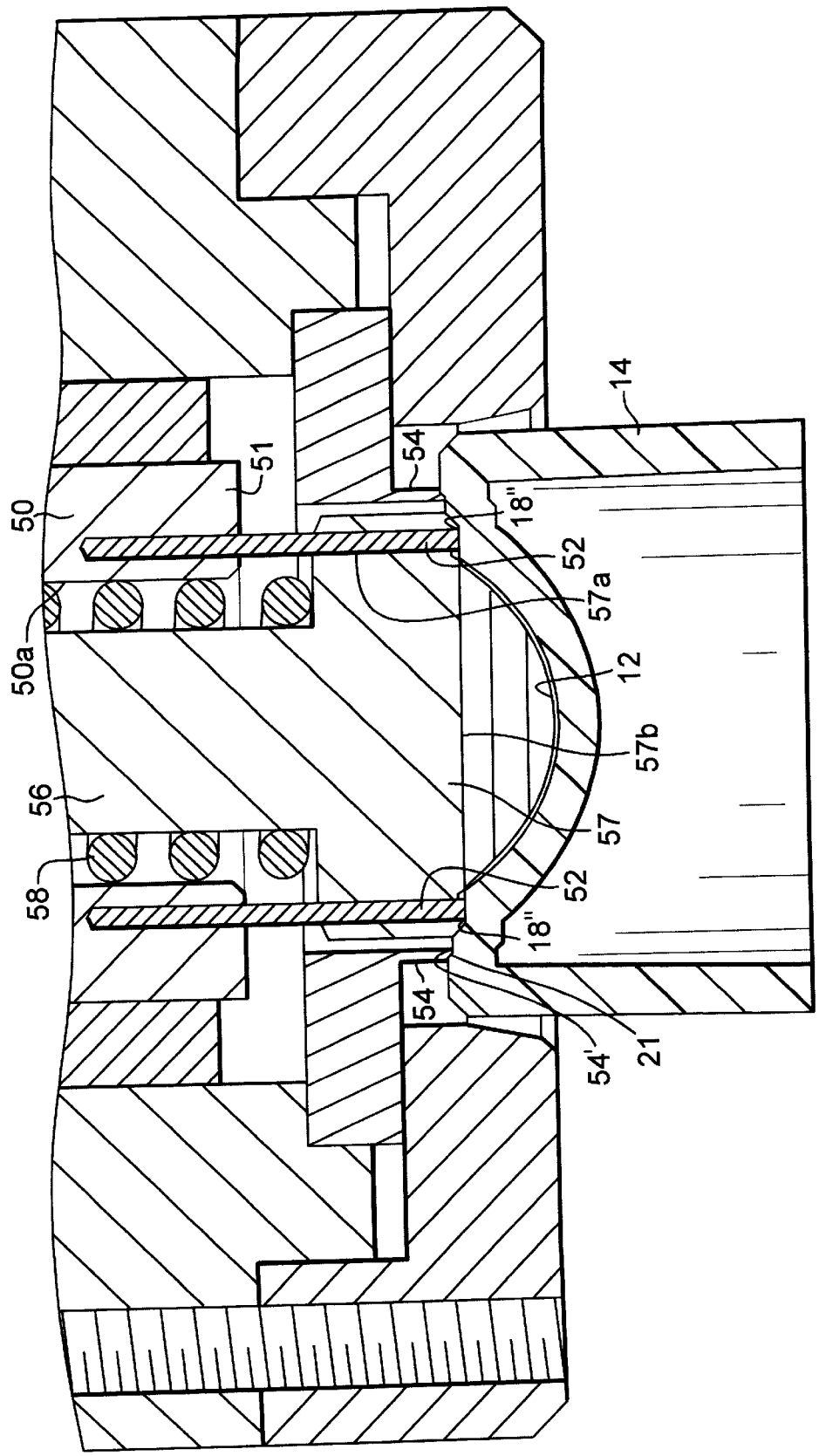
FIG. 9 is an enlarged, detail view of the part of the apparatus of the present invention which engages the female mold section in the intended manner.

Attention is now turned to the monomer ring removal apparatus and method of the invention and a preferred mechanism 30 by which this method may be carried out. As seen in FIGS. 8 and 9, a female mold section 14 having a lens 12 and monomer ring 18" adhered thereto is presented beneath mechanism 30 by action of carousel 34 as discussed above. Mechanism 30 is mounted upon a linear slide 48 (FIG. 6) for reciprocating vertical movement of mechanism 30 with respect to table 32. Once a female mold section 14 is in position beneath mechanism 30 as seen in FIG. 8, the linear slide 48 is activated which lowers mechanism 30 to remove monomer ring 18" therefrom without harming the associated lens 12.

More particularly, mechanism 30 includes a rotary actuator 49 coupled to a shaft 50 which carries a pin disk 51 having a plurality of annularly spaced pins 52 fixed thereto and extending downwardly therefrom. Pins 52 operate with mechanism 30 to pierce monomer ring 18", loosen it from female mold section 14 upon rotation of shaft 50, and then lift the ring 18" free of the female mold section upon raising mechanism 30 and pins 52. Any number of pins 52 may be used, however, three to four equally, annularly spaced pins 52 is most preferred. It is also envisioned that blades or other piercing shapes may be used in place of or in combination with pins 52.

To ensure that pins 52 pierce only the monomer ring 18" and not the female mold section 14 itself, a stop is incorporated in mechanism 30 in the form of a guide plate 54 which is fixed relative to pins 52. As mechanism 30 is lowered, the lower surface 54' of guide plate 54 engages mold shoulder 21 located outwardly adjacent the periphery of reservoir 20 (see also FIG. 2). Upon contact of guide plate 54 with female mold section 14, slider 48 stops its downward travel. By fixing the position of guide plate 54 relative to the tips of pins 52, and knowing the distance between the surfaces of shoulder 21 and reservoir 20, mechanism 30 may be calibrated to ensure the tips of pins 52 penetrate only the monomer ring 18" and do not penetrate the female mold section 14.

A second shaft 56 telescopes within a longitudinal opening 50a in shaft 50 and is axially movable therein. A stripper plate 57 is provided at the lower end of shaft 56 and includes a plurality of annularly spaced openings 57a wherethrough pins 52 freely extend, respectively. A helical spring 58 is provided about shaft 56 between internal shoulder 50b of shaft 50 and stripper plate 57 whereby shaft 56 is biased by spring 58 in a downwardly extended position relative to shaft 50. The downward travel of shaft 56 is limited by dowel 60 and in the full downward extension thereof, the free ends of pins 52 are concealed within the respective openings 57a of stripper plate 57.

As slide 48 lowers mechanism 30 over a respective female mold section 14, the lower surface 57b of stripper plate 57 engages the reservoir surface of mold section 14 which pushes shaft 56 in upwardly within shaft 50. Shaft 50, together with pins 52, continues its downward travel until guide plate 54 engages mold surface 21 and stops further downward travel of slide 48 as explained above. It will be appreciated that due to the upward travel of shaft 56 within shaft 50 which carries pins 52, the free ends of pins 52 extend and project through their respective openings 57a in stripper plate 57 and pierce the monomer ring 18" located in mold reservoir 20. Once this has happened, rotary actuator 49 is activated which rotates shaft 50 together with pins 52 which shears the monomer ring 18" from its associated mold reservoir 20. In a preferred embodiment, shaft 50 rotates about 180° with the monomer ring 18" shearing from reservoir surface 20 at about 10° of rotation. Slide 48 then raises with shaft 50 together with pins 52 and monomer ring 18".

Once the lower surface 57b of stripper plate 57 has lifted free of the reservoir surface 20, spring 58 biases shaft 56 in a downward direction relative to shaft 50, thereby retracting pins 52 within respective openings 57a which strips the monomer ring 18" from the pins 52. If desired, a source of compressed air (not shown) may also be delivered between shafts 50 and 56 to assist the biasing force of spring 58. In order to prevent the monomer ring 18" from free falling onto the surface of the female mold section 14 and lens 12, one or more blowers are provided (not shown) which direct a stream of air between the stripper plate 57 and female mold section 14 which blows and directs the released monomer ring 18" to a disposal chute (also not shown). Should the monomer ring 18" fail to be lifted from the reservoir, one blower will still blow the monomer ring 18" to the disposal chute. Also, a vacuum may be used instead of the blowers to remove the monomer ring 18".

Once the monomer ring 18" has been removed from the female mold section 14 as described above, carousel 34 is indexed to move the now monomer ring-free mold section 14 toward the exit location 44 where the mold section is now ready for lens release. At the same time, the next female mold section needing monomer ring removal is positioned beneath mechanism 30 for removal of its monomer ring 18" in the manner described herein.

It will thus be appreciated that the present invention provides a novel method and apparatus for removing a monomer ring from a mold section which may be applied in an automated production line and which safely and quickly removes the undesired cured material from the mold reservoir without harming the delicate lens contained therein. Although the invention has been shown and described herein relative to preferred embodiments thereof, it will be appreciated to those skilled in the art that various modifications may be made to suit a particular production environment. The invention is thus not to be limited by the specific embodiments or molding applications shown and described herein, but rather should be interpreted in accordance with the spirit and scope of the claims which follow.

We claim:

1. A method for removing a monomer ring from a mold configured for molding an ophthalmic lens, said method comprising the steps of piercing the monomer ring with a plurality of annularly spaced pins and rotating the pins relative to the mold to shear the monomer ring from the mold.

2. The method of claim 1 wherein said mold is a female mold section having a concave molding surface and the monomer ring is located in a reservoir formed peripherally of said concave molding surface.

3. The method of claim 2 wherein said mold is configured to mold a contact lens.

* * * * *